United States Patent
Hoang et al.

[19]

[11] Patent Number: 6,026,469

[45] Date of Patent: Feb. 15, 2000

[54] CONNECTED MODULE TYPE DISTINGUISHING APPARATUS AND METHOD

[75] Inventors: Binh Thai Hoang, Round Rock; Cuong Thanh Nguyen, Austin; Howard Carl Tanner, Austin; Gary Yuh Tsao, Austin, all of Tex.

[73] Assignee: International Business Machines Corporation, Armonk, N.Y.

[21] Appl. No.: 08/933,700

[22] Filed: Sep. 19, 1997

[51] Int. Cl.⁷ .................................................. G06F 12/00
[52] U.S. Cl. .............................. 711/118; 711/119; 711/5; 710/63
[58] Field of Search .................. 711/5, 118–119, 711/122, 3; 710/129–131, 101–103, 62–63; 365/189.11

[56] References Cited

U.S. PATENT DOCUMENTS 5,586,270  12/1996  Rotier et al. ........................... 395/282
5,594,873  1/1997  Garrett ................................... 395/281
5,898,856  4/1999  Dodd et al. ............................ 711/118

*Primary Examiner*—John W. Cabeca
*Assistant Examiner*—Denise Tran
*Attorney, Agent, or Firm*—Casimer K. Salys

[57] ABSTRACT

A module type distinguishing apparatus and method for differentiating between modules based upon the presence or absence of a pulling resistor at a specified pin connection of the modules. A high impedance pulling resistance is connected to the line and is subject to sensing while a tri-state mode of operation is initiated in the module. The presence or absence of the pulling resistor in the module is detected and recorded in a register. Differentiation between module types is accomplished based upon the binary state of the data in the register. In a particularized implementation, industry standard L2 cache modules are distinguished as to tag bit size depending on the presence or absence of a pulling resistor as detected during tri-state operation of a tag output pin.

12 Claims, 1 Drawing Sheet

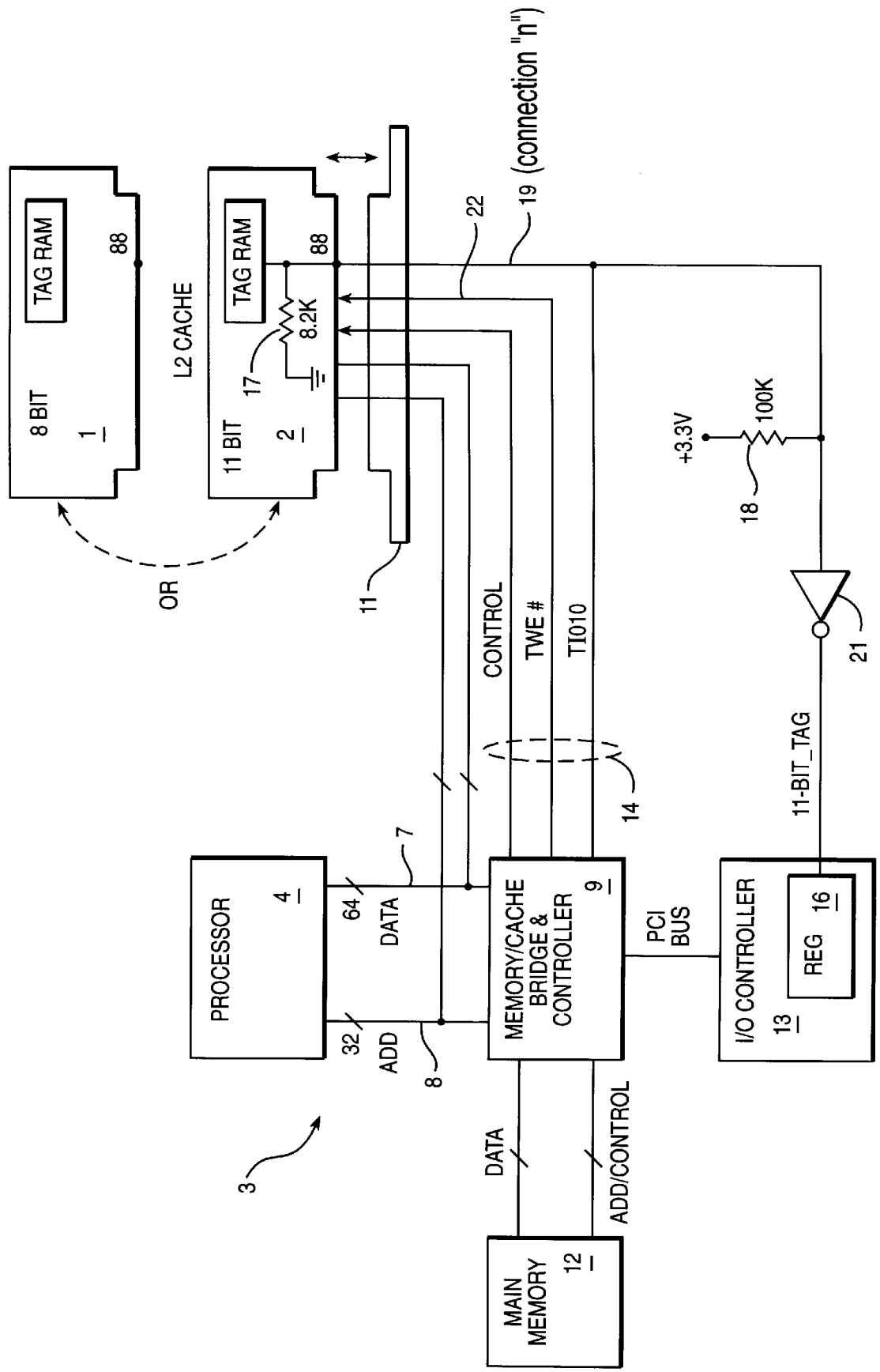

CONNECTED MODULE TYPE DISTINGUISHING APPARATUS AND METHOD

CROSS-REFERENCE TO RELATED APPLICATIONS

The present invention relates generally to the subject matter in co-pending U.S. patent application 08/772,046, filed Dec. 19, 1996.

FIELD OF THE INVENTION

The present invention relates in general to the detection of modules in electronic data processing systems. More particularly, the invention is directed to differentiating between module types responsive to the resistive characteristics of an input/output pin connected to the module.

BACKGROUND OF THE INVENTION

The prevalence of personal computers and workstations in business and home environments drives the need for greater automation in self configuration at both the hardware and software levels. At the hardware level, to which the present invention pertains, it is important that the system be able to detect not only the presence or absence of interchangeable hardware modules but also attributes representing hardware characteristics such as speed or size. The hardware detection capability is particularly important when the addition or deletion of such hardware can be performed by relatively unsophisticated end users, such as through the simple insertion, deletion or exchange of printed circuit board type modules using sockets or connectors mounted in the data processing system.

The ability to detect both the presence and functionality of printed circuit boards or modules within a personal computer or workstation is applicable to user initiated additions or deletions of memory. Level 2 (L2) cache is a particularized form of such memory, often added by the end user in the pursuit of faster program execution rates. Industry standard L2 modules include present detect bits, but do not specify presence detect information allowing personal computers or workstations to differentiate between module types. This inability to differentiate between module types precludes the use of presence detect to differentiation between industry standard cache formats of 8 tag bit or 11 tag bit modules. The tag bits indicate the page count in main memory that the L2 module is capable of handling.

Thus, there has arisen the need for personal computers or workstations have the capability of discerning whether an L2 module that is detected as being present is either the 8 tag bit or 11 tag bit variety. Moreover, this capability must apply to modules which are designed and fabricated to an industry standard not directly indicating the tag bit capability.

SUMMARY OF THE INVENTION

The present invention provides resources for a data processing system, such as a personal computer or workstation, to differentiate among module types through a module type distinguishing apparatus, comprising means for connecting first and second modules to a data processing system, the first module characterized by the absence of an active electronic device attached to connection "n" and the second module characterized by the presence of an active electronic device and related first pulling resistance attached to connection "n"s, means for enabling a tri-state mode of operation in the data processing system active electronic devices common to connection "n", means for sensing the presence of the first pulling resistance at connection "n" responsive to a second pulling resistance connected to the first pulling resistance during enablement of the tri-state mode, and means for generating a signal identifying the connection of the first or the second module responsive to an output from the means for sensing.

In another form, the invention relates to a method of distinguishing between first and second modules of different type connected to a data processing system, wherein the first module is characterized by the absence of an active electronic device attached to connection "n" and the second module is characterized by the presence of an active electronic device and related pulling resistance attached to connection "n", comprising the steps of enabling a tri-state mode of operation in data processing devices common to connection "n", sensing for the presence of the first pulling resistance at connection "n" responsive to a second pulling resistance connected to the first pulling resistance during enablement of the tri-state mode, and generating a signal identifying the connected module responsive to the effects of the first pulling resistance at connection "n".

In a particularized form of the invention, L2 cache modules of 8 tag bit and 11 tag bit types are differentiated through the connection of an externally situated weak pulling resistor to a module pin, which module connection has either an open for the 8 tag bit configuration or a pull-down resistor internal to the module for the 11 tag bit version. The size of the pull-up resistor ensures that the 11 tag bit type of L2 cache is distinguishable but not operationally affected, while the absence of a pull-down resistor in the 8 tag bit L2 cache module is detectable by sensor circuitry. The sensed state of the pin subject to one or multiple pulling resistors is detected during the personal computer or workstation boot sequence to appropriately configure the L2 controller.

These and other features of the invention will be more clearly understood and appreciated upon considering the detailed embodiments set forth hereinafter.

BRIEF DESCRIPTION OF THE DRAWINGS

The drawing schematically illustrates functional blocks suitable to differentiate between 8 tag bit and 11 tag bit industry standard L2 modules.

DESCRIPTION OF THE PREFERRED EMBODIMENT

The FIGURE illustrates by schematic diagram a preferred implementation and practice of the present invention in which L2 cache module types 1 or 2 are automatically differentiated when operated in a personal computer or workstation type data processing system, generally at 3. As illustrated in the FIGURE, the system includes processor 4, preferably a PowerPC architecture RISC processor available from IBM Corporation, connected by a data bus 7 and address bus 8 to memory/cache bridge and controller 9, and connector 11 suitable to accept L2 cache module 1 or 2 depending upon the preferences of the user. Memory/cache bridge and controller 9 interfaces processor 4 to main memory 12 and connects I/O controller 13 and various control lines 14 directed to the L2 cache module. Memory/cache bridge and controller 9 is preferably comprised of the chip set VAS96011/96012 available from VLSI Technology, Incorporated while I/O controller 13 may be any controller designed to attach to an industry standard PCI bus. Register 16 is merely one of multiple registers available for storage of data in I/O controller 13.

The industry standard L2 cache module to which the embodiment of the invention pertains uses the COASt 3.1 module standard available from Intel Corporation. As noted hereinbefore, the module can be of either 8 tag bit or 11 tag bit configuration, the number of tag bits being indicative of the number of pages distinguishable as residing in cache. The industry standard COASt L2 cache module provides four presence detect bits which unfortunately do not define the tag bit size of the module. However, the 11 tag bit implementation of the industry standard L2 cache module does require that connection TI010 of the 11 tag bit implementation have an 8.2 k ohm pull-down resistor 17 attached. In contrast, the 8 tag bit COASt L2 module has no pull-down resistor at this signal connection.

The invention as preferably implemented involves the introduction of high impedance pull-up resistor 18 with a connection to pin 88 of the L2 cache module through module socket 11, typically mounted to the system mother board (not shown). Thereby, the TI010 signal on line 19 is common to pin 88 of the L2 cache module, and is in succession amplified by inverter 21 and provided as a logic state signal to register 16 of controller 13.

Note that the 8 tag bit COASt industry standard L2 cache module 1 has its pin 88 functionally disconnected (electrically open) by hardware design.

Detection of which L2 cache module, the 8 tag bit or 11 tag bit configuration, is connected to the data processing system occurs during firmware managed startup, and in particular prior to initiation of the cache. The detection sequence commences with placing the L2 cache module tag I/O lines in a tri-state mode, using one of multiple control signals, such as TWE# on line 22, to disable (tri-state) the tag outputs. If 8 tag bit module 1 is in socket 11, pull-up resistor 18 ensures that the 11-BIT_TAG signal stored in register 16 is of a low level. In contrast, if 11 tag bit L2 cache module 2 is connected to socket 11, the size of pull-down resistor 17 is sufficiently small to pull down the voltage on line 19 and provide a high level state signal to register 16. The binary state of the signal in register 16 is detected by firmware as a part of the cache configuration routine.

Firmware reads the state of register 16 and uses this information to set registers in memory/cache bridge and controller 9 for managing the 8 tag bit or 11 tag bit L2 cache module.

The introduction of pull-up resistor 18 and its related sensing circuitry allows differentiation between industry standard L2 cache modules without materially affecting the pull-down state defined by resistor 17, in that resistor 18 is more than an order of magnitude larger.

An examination of the schematic in the FIGURE clearly evidences that refinements are possible depending on the particulars of the modules being sensed. For example, the magnitude of pull-up resistor 18 may be varied in relation to pull-down resistor 17 to ensure detection of appropriate binary states, and where appropriate may be replaced with active devices such as resistance configured field effect transistors. Obviously, the pulling effects can be reversed as to polarity. Similarly, if the alternate modules, such as 8 tag bit module 1 also have pulling resistors, threshold sensing may be employed to differentiate one from another. The underlying objective is to provide a system and method for distinguishing between module types through the interaction with existing pulling resistors during a data processing system startup phase when active input and output devices can be placed into a tri-state mode of operation.

It will be understood by those skilled in the art that the embodiments set forth hereinbefore merely exemplary of the numerous arrangements by which the invention may be practiced, and as such may be replaced by equivalents without departing from the invention which will now be defined by appended claims.

What is claimed is:

1. A module type distinguishing apparatus, comprising:

means for selectively connecting first or second modules through a connector which connects tag lines of the selected module to a data processing system, the first module characterized by the absence of an active electronic device attached to tag line "n", and the second module characterized by the presence of an active electronic device and related first pulling resistance attached to tag line "n";

means for enable a tri-state mode of operation in data processing system active electronic devices common to tag line "n";

means for sensing the presence of the first pulling resistance at tag line "n" responsive to a second pulling resistance connected to the first pulling resistance during enablement of the tri-state mode; and means for generating a signal identifying the connection of the first or the second module responsive to an output from the means for sensing.

2. The apparatus recited in claim 1, wherein the first and second modules perform analogous functions but differ as to performance capabilities.

3. The apparatus recited in claim 1, wherein the first and second modules are memories.

4. The apparatus recited in claim 3, wherein the memories are caches.

5. The apparatus recited in claim 1, further comprising a register to store the signal created by the means for generating.

6. The apparatus recited in claim 1, wherein the second pulling resistance is of materially greater impedance than the first pulling resistance.

7. The apparatus recited in claim 4, wherein the second pulling resistance if of materially greater impedance than the first pulling resistance.

8. A method of distinguishing between first and second modules selectively connectable through a connector which connects tag lines of the selected module to a data processing system, wherein the first module is characterized by the absence of an active electronic device attached to tag line "n", and the second module is characterized by the presence of an active electronic device and related first pulling resistance attached to tag line "n", comprising the steps of:

enabling a tri-state mode of operation in data processing system devices common to tag line "n";

sensing for the presence of the first pulling resistance at tag line "n" responsive to a second pulling resistance connected to the first pulling resistor during enablement of the tri-state mode; and generating a signal identifying the connected module responsive to effects of the first pulling resistance at tag line "n".

9. The method recited in claim 8, wherein the first and second modules operate to perform analogous functions but differ as to performance capabilities.

10. The method recited in claim 8, wherein the modules being distinguished are caches.

11. The method recited in claim 8, further comprising the step of:

latching information representing the generated signal in a register.

12. The method recited in claim 8, wherein the second pulling resistance is of materially greater impedance than the first pulling resistance.

* * * * *